UNITED STATES PATENT OFFICE.

LEO H. BAEKELAND, OF YONKERS, NEW YORK.

PLASTIC CONDENSATION PRODUCTS FROM ORTHOCRESOL.

1,401,953. Specification of Letters Patent. Patented Jan. 3, 1922.

No Drawing. Application filed May 10, 1918. Serial No. 233,808.

*To all whom it may concern:*

Be it known that I, LEO H. BAEKELAND, a citizen of the United States, residing at Yonkers, in the county of Westchester and State of New York, have invented certain new and useful Improvements in Plastic Condensation Products from Orthocresol, of which the following is a specification.

In my United States Patents Numbers 1,088,677 and 1,088,678 I have disclosed the possibility of increasing the strength and resistivity of condensation products prepared from cresol and methylene-containing bodies by insuring in the mixtures used a preponderance of meta-cresol, which of the three isomeric cresols reacts most readily with formaldehyde or its equivalents, and tends to form condensation products of which the infusibility and general resistance to chemicals and solvents is highest. Such use of meta-cresol or of cresol mixtures enriched in meta-cresol constitutes a direct advantage in any case where such properties are mostly desired.

A careful study of the relative behavior of the three isomers, meta-cresol, ortho-cresol, and para-cresol, has shown that ortho- and para-cresol when treated with formaldehyde or its equivalents containing a mobile methylene group (hexamethylenetetramine, etc.) according to known methods have a tendency to yield products of the so-called permanently fusible and soluble class, known also as the saliretin-resin or saliretin class. There are however some conditions under which products of the infusible class are formed. For instance, infusible products are obtained when para-cresol reacts upon formaldehyde present in sufficient proportions, provided caustic soda is used as the condensing agent. If, however, hydrochloric acid is used as a condensing agent the product is more or less fusible and brittle, being similar in this respect to the saliretins, or resins of the Novolak type, even when relatively large proportions of formaldehyde are used; that is to say, such proportions as in the case of phenol or meta-cresol would produce decidedly hard and infusible products.

Ortho-cresol, although less apt to yield infusible products than phenol (oxybenzol) or meta-cresol, can under certain conditions be made to yield infusible condensation products; but in general this requires higher temperatures and decidedly longer heating than when meta-cresol or phenol is used under the same conditions. Infusible products are however readily obtained from ortho-cresol and sufficient formaldehyde or its equivalents under certain conditions as described below, especially when basic condensing agents, including the fixed alkalies, are used.

The results are therefore distinctly differentiated from those described in the patents of Farbenfabriken vorm. Friedr. Bayer & Co. (German Patent No. 201,261 and British Patent No. 26,317 of 1907). Nevertheless, the general fact remains that ortho-cresol and para-cresol, in those reactions which yield infusible condensation products, act more slowly than meta-cresol or phenol.

According to the present invention this property of ortho- and para-cresols is utilized for retarding to any desired degree the moment of final hardening in any of the molding or other processes in which these condensation products have found their industrial uses, and for increasing the thermoplastic quality of the products. In this connection it is explained that ortho- and para-cresol, and the resinous condensation products derived therefrom, are unusually good solvents for similar condensation products prepared from meta-cresol or phenol, or mixtures thereof. There are relatively few substances which can perform the functions of solid solvents for the final product after complete final hardening has set in. Most other solvents act as such to a limited extent, or during the preliminary phases of the reaction; but most of them are either partially or totally expelled when complete polymerization or hardening has taken place. I therefore utilize these special properties of ortho-cresol and para-cresol, and am thereby enabled to regulate not only the rate and degree of hardening, but also the plasticity of any preparations or mixtures in which resinous condensation products of meta-cresol or phenol, or other similar phenolic products are utilized. This result may be accomplished by artificially increasing the content of ortho-cresol or para-cresol or mixtures thereof in the ordinary commercial cresol of the trade; or by adding ortho-cresol or para-cresol or mixtures thereof to phenol used for the manufacture of condensation products; or by introducing into molding mixtures or other preparations in which phenolic condensation products are used, a certain proportion of initial or intermediate condensation products prepared either from ortho-cresol or para-cresol or from mixtures rich in these two isomeric cresols; or again by utilizing the fact that saliretin resins when heated with formaldehyde, paraform, hexamethylenetetramine, or other body containing a mobile methylene group, can be transformed into an infusible condensation product in a second step, and so carrying out this two-step reaction that at first a certain proportion of special saliretin, prepared from ortho-cresol or para-cresol or from mixtures rich in ortho- and para-cresol, is added to the saliretin derived from meta-cresol, phenol, or mixtures rich in these bodies, or other suitable phenolic bodies. In this way the reaction of the formaldehyde, paraform, hexamethylenetetramine, or the like upon the saliretin will be decidedly retarded, allowing at the same time greater plasticity and more latitude in the working of the products.

In fact if para-cresol is used alone, or is largely preponderant over the other phenolic bodies, it is possible, even when using a large excess of formaldehyde or its equivalents (paraform, hexamethylenetetramine, etc.) to obtain a final product, infusible at 100° C., which although very hard and strong, yet softens materially at high temperatures (for example 212° C.), to the extent of beginning to melt or becoming viscous; or this product may be so prepared that it is decidedly fusible at these high temperatures, or at temperatures materially above 115° C., for instance by the use of cresol in higher proportions. As an example, a hard, tough product is obtained by heating 100 parts by weight of para-cresol with 45 parts by weight of hexamethylenetetramine, either in presence or absence of water, in an open vessel at about 180-200° C. until a portion only of the ammonia has been driven off; then cooling somewhat and pouring the yet liquid mass into a container; and thereafter hardening by heating for about twenty-four hours at about 165° C., this heating being preferably carried out under increased pressure, as the operation is otherwise difficult to control and is apt to produce irregular masses. The proportion of hexamethylenetetramine used may be varied considerably; for example, quite similar results are obtained by using in the above example either thirty grams of hexamethylenetetramine, or fifty grams. Instead of hexamethylenetetramine a mixture of formaldehyde and ammonia can be used, which is equivalent in its action.

Ortho-cresol under similar conditions will give similar results, although the final product is less fusible, or exhibits some tendency to become infusible.

It should be noted that phenol and meta-cresol, under conditions as specified above, yield infusible products.

The product from para-cresol, although fusible, is decidedly less so than ordinary saliretin resins, which melt at temperatures in the neighborhood of 100° C., or even lower than this. By diminishing the proportion of hexamethylenetetramine or of formaldehyde, yet more fusible products are obtained, but they are also more brittle.

In view of the differences as above set forth in the properties of condensation products derived from phenol and from the isomeric cresols, it will be seen that ortho-cresol and para-cresol, as well as mixtures thereof, are to be regarded for the purposes of this invention as equivalent plasticizing and retarding agents for condensation products prepared from phenol or meta-cresol or mixtures thereof.

As stated above, I have found it possible under proper conditions to prepare condensation products of the infusible type from ortho-cresol, including mixtures sufficiently enriched in ortho-cresol. Following are certain typical examples of operating methods yielding infusible hard products from ortho-cresol:—

Example I.

100 grams of ortho-cresol are mixed with 64 grams of a 40 per cent formaldehyde solution and 1.6 cubic centimeters of strong aqueous hydrochloric acid. The reaction product including the aqueous layer is boiled for about two hours, then evaporated and heated to 200° C. The product is a fusible resin of the saliretin type. This is mixed with about 7-15 per cent by weight of paraform, and heated for 24-48 hours in a closed vessel or mold, the heat being applied by means of steam at a pressure of 45-90 pounds. The product is hard and infusible.

Example II.

100 grams of ortho-cresol are mixed with 150 grams of 40 per cent formaldehyde in presence of 2.5 cubic centimeters of strong aqueous hydrochloric acid. The mixture is boiled for fifty minutes, and the reaction product heated under sixty pounds steam pressure for ten hours. The product is infusible and tough, with a horny cut.

Example III.

100 grams of ortho-cresol are mixed with 90 grams formaldehyde and eight cubic centimeters strong aqueous ammonia. The mixture is boiled for eleven hours and then heated under 90 pounds steam pressure for ten to fourteen hours. The product is infusible, tough and hard.

*Example IV.*

100 grams ortho-cresol are mixed with eighty grams of formaldehyde and five grams of caustic soda. The mixture is boiled one-half hour, and the resulting product heated under pressure as above. The product is very hard, tough and infusible. A similar product was obtained using 100 grams of ortho-cresol, 100 grams of formaldehyde solution, and three grams of caustic soda. Caustic potash is equivalent to caustic soda in this reaction.

Under proper conditions ortho-cresol may be made to yield a condensation product which while tough and horny is nevertheless fusible.

*Example V.*

100 grams ortho-cresol are mixed with forty grams of hexamethylenetetramine and heated to 200° C., then in a closed vessel for 24 hours under ninety pounds steam pressure. The product was tough, with a horny cut, but still fusible.

The present application is a continuation of my prior application Serial No. 130,432, filed November 9, 1916.

I claim:—

1. A molding mixture comprising a plurality of condensation products of phenolic bodies and a substance containing a mobile methylene group, said mixture being characterized by the presence of a condensation product of ortho-cresol in excess of the proportion existing in condensation products derived from commercial cresol mixtures.

2. A molding mixture comprising a plurality of condensation products of phenolic bodies and a substance containing a mobile methylene group, said mixture being characterized by the presence of a condensation product of ortho-cresol in excess of the proportion existing in condensation products derived from commercial cresol mixtures, and by the presence therein of ammonia.

3. In a process of making phenolic condensation products, the step which consists in reacting with a body containing a mobile methylene group upon a phenolic mixture enriched in ortho-cresol.

4. In a process of making phenolic condensation products, the step which consists in reacting with a body containing a mobile methylene group upon a cresol mixture enriched in ortho-cresol.

In testimony whereof, I affix my signature.

LEO H. BAEKELAND.